United States Patent
Kang et al.

(10) Patent No.: US 12,046,904 B2
(45) Date of Patent: Jul. 23, 2024

(54) ENERGY STORAGE SYSTEM HAVING OPERATION MODE BASED ON REFERENCE CAPACITY OF INTEGRATED LINE AND METHOD OF OPERATION THEREOF

(71) Applicant: EN Technologies Inc., Gyeonggi-do (KR)

(72) Inventors: Hyun Jae Kang, Seoul (KR); Seung Sig Nam, Gyeonggi-do (KR); Tay Seek Lee, Gyeonggi-do (KR); Seong Ho Yun, Seoul (KR); Hee Se Hong, Gyeonggi-do (KR)

(73) Assignee: EN TECHNOLOGIES INC., Gyeonggi-Do (KR)

( * ) Notice: Subject to any disclaimer, the term of this patent is extended or adjusted under 35 U.S.C. 154(b) by 0 days.

(21) Appl. No.: 18/368,093

(22) Filed: Sep. 14, 2023

(65) Prior Publication Data

US 2024/0097450 A1 Mar. 21, 2024

(30) Foreign Application Priority Data

Sep. 15, 2022 (KR) ........................ 10-2022-0116180

(51) Int. Cl.
*H02J 3/32* (2006.01)
*H02J 3/00* (2006.01)

(52) U.S. Cl.
CPC ................ *H02J 3/32* (2013.01); *H02J 3/004* (2020.01); *H02J 2203/10* (2020.01); *H02J 2203/20* (2020.01); *H02J 2300/20* (2020.01)

(58) Field of Classification Search
None
See application file for complete search history.

(56) References Cited

U.S. PATENT DOCUMENTS

| 2011/0055036 A1* | 3/2011 | Helfan | ................... G06Q 30/04 |
| | | | 705/26.1 |
| 2016/0281607 A1* | 9/2016 | Asati | ......................... F02C 7/26 |
| 2023/0120165 A1* | 4/2023 | Hansen | ................... H02J 3/466 |
| | | | 700/286 |

FOREIGN PATENT DOCUMENTS

| KR | 10-2016-0076376 A | 6/2016 |
| KR | 10-2019-0019394 A | 2/2019 |

(Continued)

OTHER PUBLICATIONS

Office action issued on Nov. 9, 2022 from Korean Patent Office in a counterpart Korean Patent Application No. 10-2022-0116180 (all the cited references are listed in this IDS.) (English translation is also submitted herewith.).

(Continued)

*Primary Examiner* — Mohammad Ali
*Assistant Examiner* — Saad M Kabir
(74) *Attorney, Agent, or Firm* — The PL Law Group, PLLC

(57) ABSTRACT

An energy storage system includes an energy storage device that stores energy generated from a new and renewable energy power plant, a power management device that monitors a total amount of power produced by at least one new and renewable energy power plant in a plurality of regions, determines an operation mode of the energy storage device based on a result of monitoring a reference capacity of an integrated line through which power of the plurality of regions is transmitted and a result of monitoring the total power amount, and controls a power capacity flowing through the integrated line according to the operation mode, and a power conversion device that receives a command corresponding to the operation mode from the power man- (Continued)

agement device and controls an operation of the energy storage device according to the command.

13 Claims, 10 Drawing Sheets

(56) References Cited

FOREIGN PATENT DOCUMENTS

| | | |
|---|---|---|
| KR | 10-2019-0024368 A | 3/2019 |
| KR | 10-1971906 B1 | 4/2019 |
| KR | 10-2021-0052925 A | 5/2021 |

OTHER PUBLICATIONS

Notice of Allowance issued on Mar. 29, 2023 from Korean Patent Office in a counterpart Korean Patent Application No. 10-2022-0116180 (all the cited references are listed in this IDS.) (English translation is also submitted herewith.).

* cited by examiner

ENERGY STORAGE SYSTEM HAVING OPERATION MODE BASED ON REFERENCE CAPACITY OF INTEGRATED LINE AND METHOD OF OPERATION THEREOF

CROSS-REFERENCE TO RELATED APPLICATION AND CLAIM OF PRIORITY

This application claims the benefit under 35 USC § 119(a) of Korean Patent Application No. 10-2022-0116180 filed on Sep. 15, 2022, in the Korean Intellectual Property Office, the entire disclosure of which is incorporated herein by reference for all purposes.

BACKGROUND

1. Field

The present disclosure relates to an energy storage system.

2. Description of Related Art

An electrical power system refers to a system in which a power plant, a substation, a transmission and distribution line, and a load are integrated to generate and use power. The power plant produces electricity and transmits the electricity to a transmission-end substation. The transmission-end substation transmits electricity to a distribution-end substation. The distribution-end substation divides and distributes electricity to final consumers.

Meanwhile, there is a lot of interest in new and renewable energy with which electricity can be generated without carbon dioxide emission, and the expansion of new and renewable energy plants is inevitable. As the new and renewable energy power plants are expanded, a technology capable of stably supplying power while efficiently using existing facilities is required.

SUMMARY

It is intended to contribute to the stabilization of the electrical power system through the energy storage system without the expansion of a line even if new and renewable energy power plants are expanded.

It is intended to operate the line without the expansion of a line by adjusting the load of an integrated line using the energy storage system.

It is intended to improve a utilization rate of the integrated line by controlling a charging operation or a discharging operation of the energy storage system.

It is intended to achieve the goal of reducing carbon dioxide by expanding new and renewable energy power plants in existing facilities.

According to an aspect of the present disclosure, there is provided an energy storage system including an energy storage device that stores energy generated from a new and renewable energy power plant, a power management device that monitors a total amount of power produced by at least one new and renewable energy power plant in a plurality of regions, determines an operation mode of the energy storage device based on a reference capacity of an integrated line through which power of the plurality of regions is transmitted and a result of monitoring the total power amount, and controls a power capacity flowing through the integrated line according to the operation mode, and a power conversion device that receives a command corresponding to the operation mode from the power management device and controls an operation of the energy storage device according to the command, in which the power management device obtains regional history information about the amount of power produced by the plurality of regions, predicts an amount of power corresponding to a condition, which is based on a storage capacity of the energy storage device and the reference capacity of the integrated line, of a new and renewable energy power plant to be newly installed using the condition and the regional history information, and generates modeling information including information on an installation region, a type of the new renewable energy power plant to be newly installed, and an operational schedule corresponding to the type, based on the predicted amount of power.

According to another aspect of the present disclosure, there is provided a method of operation of an energy storage system including monitoring a total amount of power produced by at least one new and renewable energy power plant in a plurality of regions, determining an operation mode of an energy storage device based on a reference capacity of an integrated line through which power of the plurality of regions is transmitted and a result of monitoring the total power amount, and controlling a power capacity flowing through the integrated line according to the operation mode, in which the method of operation of the energy storage system further includes obtaining regional history information about an amount of power produced by the plurality of regions, predicting an amount of power corresponding to a condition, which is based on a storage capacity of the energy storage device and the reference capacity of the integrated line, of a new and renewable energy power plant to be newly installed using the condition and the regional history information, and generating modeling information including information on an installation location of the new and renewable energy power plant to be newly installed, a type thereof, and an operational schedule corresponding to the type, based on the predicted amount of power.

According to still another aspect of the present disclosure, there is provided a power system including new and renewable energy power plants in a plurality of regions, an integrated line that is connected to the new and renewable energy power plants in the plurality of regions and supplies generated power to an electrical power system, and an energy storage system that is connected to the integrated line, monitors a total amount of power produced by at least one new and renewable energy power plant in the plurality of regions, determines an operation mode of an energy storage device based on a reference capacity of an integrated line through which power of the plurality of regions is transmitted and a result of monitoring the total amount of power, and controls a power capacity flowing through the integrated line according to the operation mode, in which the energy storage system obtains regional history information about an amount of power produced by the plurality of regions, predicts an amount of power corresponding to a condition, which is based on a storage capacity of the energy storage device and the reference capacity of the integrated line, of a new and renewable energy power plant to be newly installed using the condition and the regional history information, and generates modeling information including information on an installation region of the new renewable energy power plant to be newly installed, a type thereof, and an operational schedule corresponding to the type, based on the predicted amount of power.

BRIEF DESCRIPTION OF THE DRAWINGS

The present disclosure may be readily understood in combination with the detailed description that follows and the accompanying drawings, wherein reference numerals denote structural elements.

DETAILED DESCRIPTION

Figure 1:
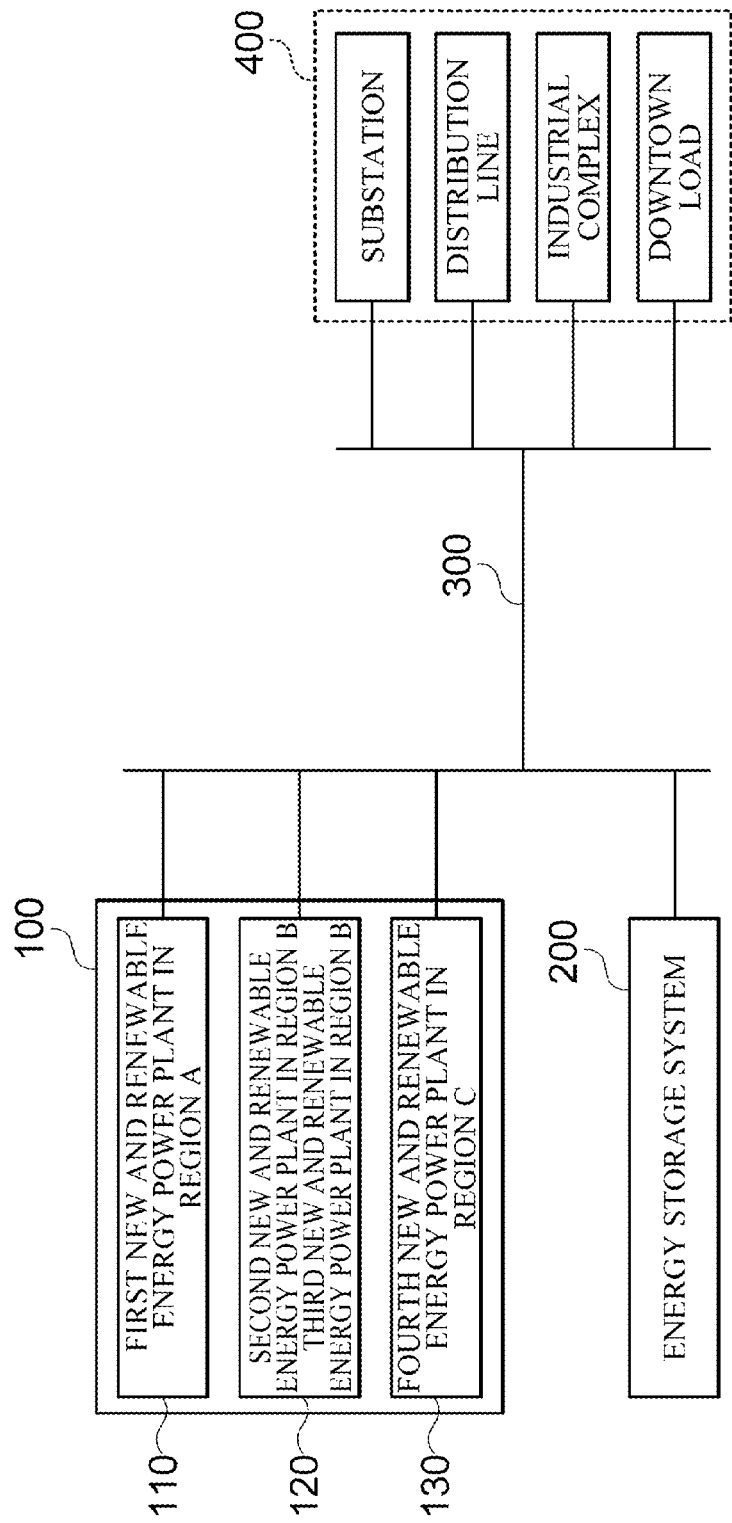
FIG. 1 illustrates a power system that controls a power capacity of a line for supplying power generated by a new and renewable energy power plant in a plurality of regions to an electrical power system according to an embodiment.

Hereinafter, various embodiments will be described in detail with reference to the drawings. Embodiments described below may be modified and implemented in various different forms. In order to more clearly describe the characteristics of the embodiments, a detailed description of matters widely known to those skilled in the art to which the following embodiments belong will be omitted.

Meanwhile, in this specification, when a configuration is said to be "connected" to another configuration, this includes not only the case of being 'directly connected', but also the case of being 'connected with another configuration in between'. In addition, when a configuration is said to "include" another configuration this means that it may further include other configurations rather than excluding other configurations unless otherwise specified.

In addition, terms including ordinal numbers such as 'first' or 'second' used in this specification may be used to describe various components, but the components should not be limited by the terms. These terms are only used for the purpose of distinguishing one component from another component.

Throughout the specification, "new and renewable energy" means a combination of new energy and renewable energy. "New energy" refers to energy that is used by converting existing fossil fuels or that uses electricity or heat through chemical reactions such as hydrogen and oxygen. For example, types of new energy may include hydrogen energy, fuel cells, liquefied coal gas, etc. "Renewable energy" means energy used by converting renewable energy including sunlight, water, geothermal heat, precipitation, biological organisms, etc. For example, types of renewable energy may include sunlight, solar heat, wind power, hydropower, ocean energy, geothermal heat, bioenergy, waste energy, etc.

Throughout the specification, the "new and renewable energy power plant" means a place that generates electricity by converting new and renewable energy into electrical energy.

Throughout the specification, the "energy storage system" refers to a system that stores excess power and uses it when the power is insufficient or delivers the power where needed. The energy storage system may charge part of power supplied from a power plant and discharge charged power when the power is insufficient.

Throughout the specification, the "integrated line" refers to an integrated path that is connected to a plurality of new and renewable energy power plant and the energy storage system and supplies power received from the new and renewable energy plant or energy storage system to a load. The plurality of new and renewable energy power plants may be grouped according to an installation region of the power plant. Power produced in respective regions is delivered to the integrated line through individual lines, and the power delivered to the integrated line may be supplied to the load. The individual lines are lines through which power produced within the respective regions flows, and the integrated line is a line where power produced within the respective regions is aggregated. A "reference capacity" of the integrated line means an amount of power that can be transmitted through the integrated line. The reference capacity may be a maximum transmission capacity or a preset transmission capacity.

FIG. 1 illustrates a power system that controls power capacity of lines for supplying power generated by new and renewable energy power plants within a plurality of regions to an electrical power system according to an embodiment.

Referring to FIG. 1, the power system may be configured with a new and renewable energy power plant 100 in the plurality of regions, an energy storage system 200, an integrated line 300, and a load 400. For example, as illustrated in FIG. 1, the new and renewable energy power plant 100 within the plurality of regions may be divided into a new and renewable energy power plant 110 in region A, a new and renewable energy power plant 120 in region B, and a new and renewable energy power plant 130 in region C depending on the installation region.

For example, the new and renewable energy power plant may be a solar power plant, a wind power plant, a tidal power plant, a wave power plant, a fuel cell power plant, a bio power plant, etc., and is not limited to the above examples. For example, the load may be a substation, a distribution line, an industrial complex, a downtown load, etc.

The energy storage system 200 may charge part of power produced by the new and renewable energy power plants 100 within the plurality of regions to an energy storage device that is a storage space within the energy storage system 200, and discharge the power charged in the energy storage device depending on the state of the integrated line 300 or the load 400.

For example, it is assumed that power as much as a reference capacity can be transmitted through the integrated line 300. When a total amount of power produced by the new and renewable energy power plant 100 in the plurality of regions exceeds the reference capacity, a storage space for storing the excess power or an additional integrated line for accommodating the excess power is required. The energy storage system 200 may store the excess power and supply power when needed even without installing the additional integrated line.

For example, when the total amount of power produced by the new and renewable energy plant 100 in the plurality of regions exceeds the reference capacity of the integrated line 300, the energy storage system 200 may charge an amount of power as much as the power exceeding the reference capacity of the integrated line 300 for the total amount of power. By charging the excess power in the energy storage system 200, the capacity of the integrated line 300 may be maintained as much as the reference capacity.

For example, if the total amount of power produced by the new and renewable energy power plant 100 within the plurality of regions does not exceed the reference capacity of the integrated line 300, the integrated line 300 may additionally accommodate power other than the total amount of power. In this case, the energy storage system 200 may discharge part of the power charged in the energy storage device, which is a storage space within the energy storage system 200, to the integrated line 300. The energy storage system 200 may control the operation of the energy storage system 200 so that a power capacity flowing through the integrated line 300 is as large as the reference capacity.

Figure 2:
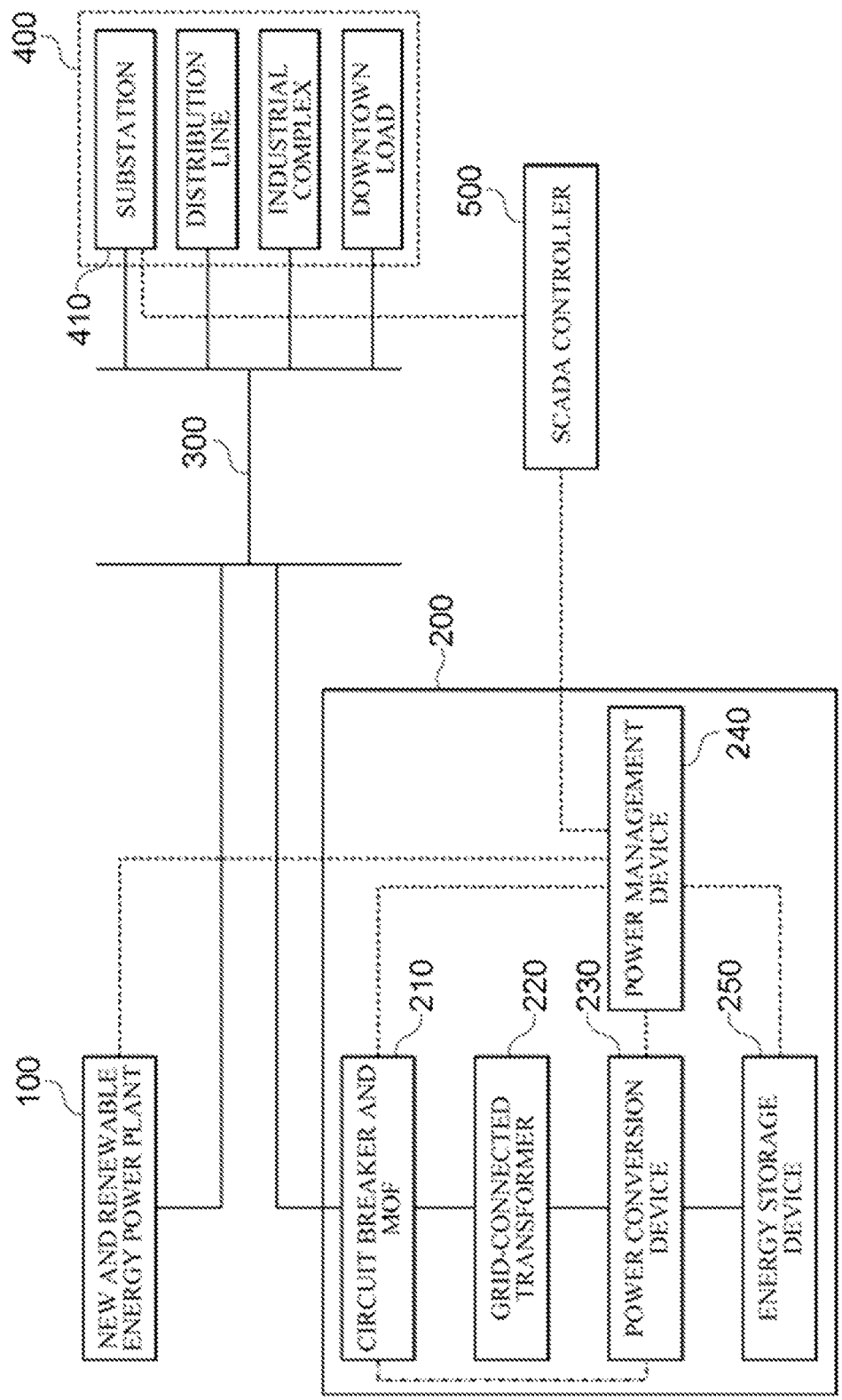
FIG. 2 is a block diagram illustrating a configuration of an energy storage system according to an embodiment.

FIG. 2 is a block diagram illustrating a configuration of the energy storage system according to an embodiment.

Referring to FIG. 2, the energy storage system 200 may include a circuit breaker and MOF 210, a grid-connected transformer 220, a power conversion device 230, an energy storage device 250, and a power management device 240. However, not all illustrated components are essential components. The energy storage system 200 may be implemented with more components than those illustrated, and the energy storage system 200 may be implemented with fewer components. Hereinafter, the above components will be described. The energy storage system 200 illustrated in FIG. 2 may correspond identically to the energy storage system 200 illustrated in FIG. 1. The new and renewable energy power plant 100 illustrated in FIG. 2 may correspond identically to the renewable energy power plant 100 illustrated in FIG. 1.

The circuit breaker and MOF 210 may monitor whether abnormal voltage, abnormal current, abnormal frequency, or abnormal temperature are detected on the energy storage system 200 in order to protect the energy storage system 200, and stop the operation of the energy storage system 200 when an abnormality occurs.

The grid-connected transformer 220 may adjust the magnitude of voltage in order to supply power to the electrical power system side. Since power loss occurs due to resistance of the integrated line 300, the grid-connected transformer 220 may supply power by increasing the magnitude of voltage.

The energy storage device 250 may store energy generated by the new and renewable energy power plant 100. For example, referring back to FIG. 1, the energy storage device 250 may charge power produced by the new and renewable energy power plant 110 in region A, the new and renewable energy power plant 120 in region B, and the new and renewable energy power plant 130 in region C. Additionally, the energy storage device 250 may charge power from a new and renewable energy power plant in a region selected from region A, region B, and region C. Additionally, the energy storage device 250 may charge power from a predetermined new and renewable energy power plant within the selected region, or may charge only part of the power.

For example, the energy storage device 250 may include a battery and a battery management module. The battery may discharge charged power or charge power through the power conversion device 230 according to an operation mode of the energy storage device 250. The battery management module may manage state information of the battery.

The power management device 240 may monitor an amount of power of the new and renewable energy power plant 100. The power management device 240 may determine the operation mode of the energy storage device 250 based on a result of monitoring the amount of power and the reference capacity of the integrated line 300 connected to the new and renewable energy power plant 100. The power management device 240 may control the power capacity flowing through the integrated line 300 according to the operation mode of the energy storage device 250.

The power conversion device 230 may receive a command corresponding to the operation mode of the energy storage device 250 from the power management device 240 and control the operation of the energy storage device 250 according to the command.

For example, the power management device 240 may obtain state information, operational information, operating information, and operation availability information of the power conversion device 230 from the power conversion device 230. The state information of the power conversion device 230 may be information such as an operating state, circuit breaker information, network, etc. The operational information of the power conversion device 230 may be information such as voltage, current, power, frequency, inverter, etc. The operating information of the power conversion device 230 may be information such as an operating mode, a charge amount, a discharge amount, an accumulated charge amount, an accumulated discharge amount, etc. The operation availability information of the power conversion device 230 may be information such as abnormal voltage, abnormal current, abnormal frequency, abnormal temperature for protection of the power conversion device 230, etc.

For example, the power management device 240 may obtain information such as a state of battery circuit breaker, temperature, voltage, current, power, charge amount, discharge amount, accumulated charge amount, accumulated discharge amount, etc. and battery operation availability by communicating with the battery management module.

For example, when the amount of power of the new and renewable energy power plant 100 within the plurality of regions exceeds the reference capacity of the integrated line 300, the power management device 240 may determine the operation mode of the energy storage device 250 as a charging mode. The power management device 240 may deliver, to the power conversion device 230, a first command for controlling such that excess power of the amount of power exceeding the reference capacity of the integrated line 300 is stored in the energy storage device 250. The power conversion device 230 may store excess power in the energy storage device 250 according to the first command. The energy storage device 250 may store DC power converted to DC.

For another example, when the amount of power of the new and renewable energy power plant 100 within the plurality of regions does not exceed the reference capacity of the integrated line 300, the power management device 240 may determine the operation mode of the energy storage device 250 as a discharging mode. The power management device 240 may deliver a second command for discharging the power charged in the energy storage device 250 to the power conversion device 230, based on the total amount of power of the new and renewable energy power plant 100, so that the power capacity flowing through the integrated line 300 is as large as the reference capacity. The power conversion device 230 may discharge the power charged in the energy storage device 250 according to the second command.

For example, the new and renewable energy power plants 100 within the plurality of regions may be configured with at least one new and renewable energy power plant for each region. The power management device 240 may monitor the individual power amount of the new and renewable energy power plants in each of a plurality of regions, and determine whether or not the operation mode for the energy storage device 250 for each of the plurality of regions, based on the result of monitoring the individual power amount and the reference capacity of the integrated line 300.

For example, when the total amount of power generated by a first new and renewable energy power plant in a first region and a second new and renewable energy power plant in a second region exceeds the reference capacity of the integrated line 300 and the power capacity generated by the first renewable energy power plant 100 does not exceed the reference capacity of the integrated line 300, the power management device 240 may perform control such that the operation mode of the energy storage device 250 for the first region is deactivated and power generated by the first new and renewable energy power plant is transmitted to the integrated line 300. In addition, the power management device 240 may determine the operation mode of the energy storage device 250 for the second region as the charging mode, and charge the power generated by the second new and renewable energy power plant in the energy storage device 250. In addition, the power management device 240 may charge part of the power generated by the second new and renewable energy power plant in the energy storage device 250 within a range in which the power capacity flowing through the integrated line 300 does not exceed the reference capacity.

For example, when the total amount of power generated by the first new and renewable energy power plant in the first region and the second new renewable energy power plant in the second region does not exceed the reference capacity of the integrated line 300, the power management device 240 may perform control such that the operation mode of the energy storage device 250 for the plurality of regions and the power generated by the first new and renewable energy power plant and the second new and renewable energy power plant is transmitted to the integrated line 300.

For example, when the first new and renewable energy power plant is newly installed in the first region among the plurality of regions, the power management device 240 may determine the operation mode of the energy storage device 250 based on the results of monitoring the amount of power at least one new and renewable energy power plant within the plurality of regions and the first new and renewable energy power plant and the reference capacity of the integrated line 300. That is, even if the new and renewable energy power plant 100 is additionally installed, power exceeding the reference capacity of the integrated line 300 is charged in the energy storage device 250, thereby contributing to stabilization of the electrical power system without the expansion of the integrated line 300.

For example, the power management device 240 may obtain regional history information about the amount of power produced in the plurality of regions. The power management device 240 may predict the amount of power demanded by a new and renewable energy power plant 100 to be newly installed based on the regional history information, the storage capacity of the energy storage device 250, and the reference capacity of the integrated line 300. For example, the power management device 240 may calculate, for each of the plurality of regions, an average amount of power produced during a preset period by the new and renewable energy power plant located within the region. The power management device 240 may predict the amount of power demand based on the average amount of power corresponding to the plurality of regions, the storage capacity of the energy storage device 250, and the reference capacity of the integrated line 300.

For example, the power management device 240 may generate, based on the amount of power demand, modeling information including information on an installation region the new and renewable energy power plant 100 to be newly installed, a type thereof, and operational schedule corresponding to the type.

For example, the energy storage device 250 may include a battery and a battery management module. The battery may store DC power obtained by converting power of the new and renewable energy power plant 100 from AC to DC through the power conversion device 230. For example, when the total amount of power of the new and renewable energy power plant 100 in the plurality of regions exceeds the reference capacity of the integrated line 300, the battery may store power through a DC conversion device. In addition, the battery may discharge charged power through the power conversion device 230 to the electrical power system. For example, when the total amount of power of the new and renewable energy power plant 100 in the plurality of regions does not exceed the reference capacity of the integrated line 300 or when the power system line 300 is repaired from a failure, the battery may discharge the charged power to the electrical power system.

The battery management module may obtain state information such as operating state of battery, remaining capacity of battery, durability of battery, temperature, voltage, current, charge amount, discharge amount, etc. The battery management module may cut off a circuit breaker when an abnormal state is detected in the battery.

The battery management module may provide the state information of the battery to the power management device 240 by communicating with the power management device 240. The power management device 240 may efficiently manage the battery using the state information of the battery provided from the battery management module.

In addition, the energy storage device 250 may include a circuit breaker that cuts off the DC power when an abnormality occurs from the power conversion device 230 and a fuse that protects the battery when an overcurrent occurs.

The power management device 240 may efficiently control charging or discharging of the energy storage system 200 by monitoring the total amount of power from the new and renewable energy power plant 100 in the plurality of regions. Accordingly, even if the new and renewable energy power plant 100 is newly established in a predetermined region, the line 300 may be operated without the expansion of the integrated line 300 by adjusting the load of the integrated line 300 by the energy storage system 200.

Meanwhile, a SCADA controller 500 may obtain operating power information such as current, voltage, etc. by communicating with the substation 410. In addition, the SCADA controller 500 may obtain and monitor failure information of a transmission-end transformer and failure information of the transmission line 300. The power management device 240 may obtain operational information of the electrical power system, failure information of the transmission-end transformer, and failure information of the transmission line 300 by communicating with the SCADA controller 500.

Figure 3:
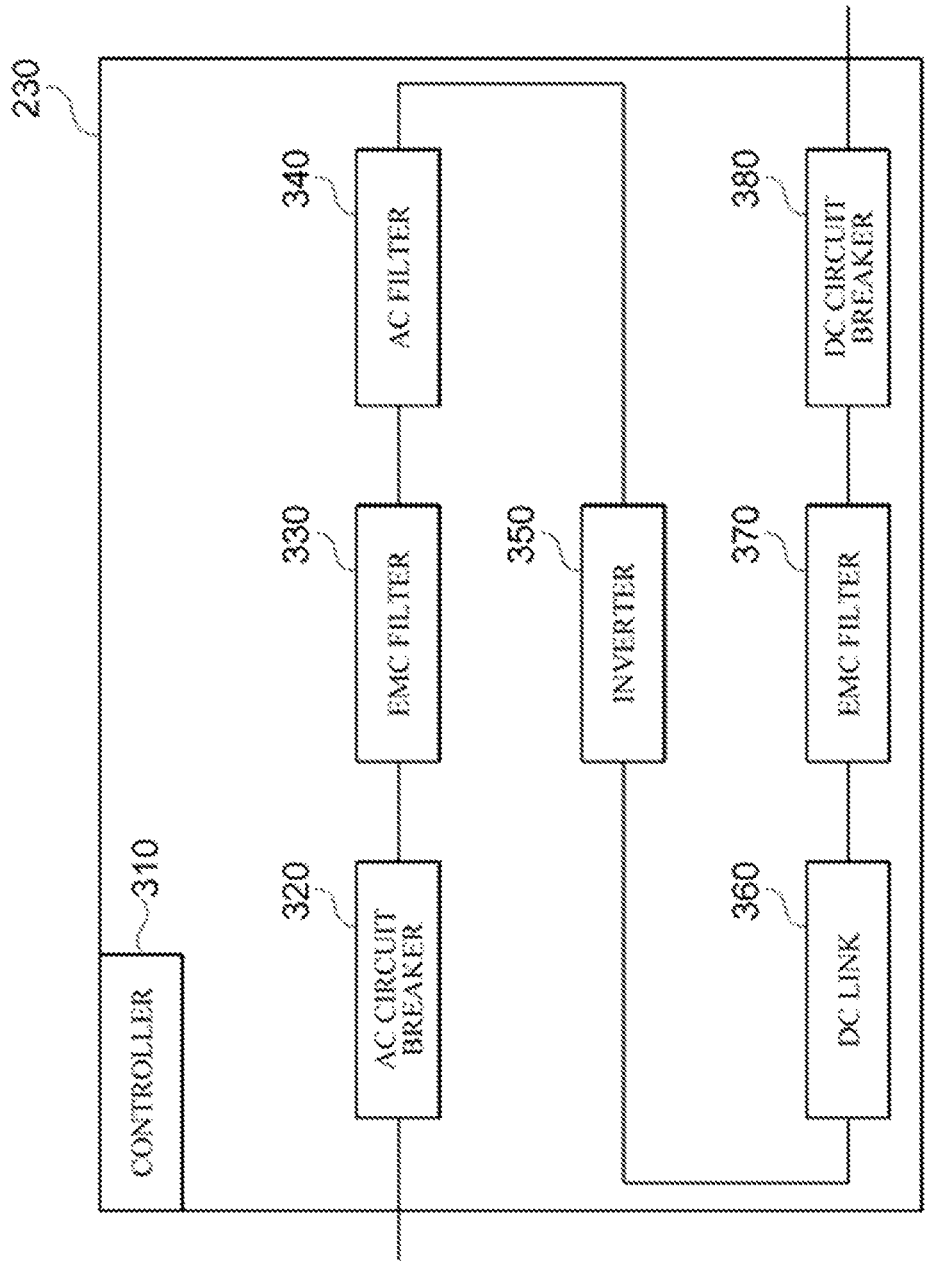
FIG. 3 is a block diagram illustrating a configuration of a power conversion device according to an embodiment.

FIG. 3 is a block diagram illustrating a configuration of the power conversion device according to an embodiment.

Referring to FIG. 3, the power conversion device 230 may include a controller 310, an AC circuit breaker 320, an EMC filter 330, an AC filter 340, an inverter 350, a DC link 360, an EMC filter 370, and a DC circuit breaker 380.

The controller 310 may control the operation of the AC breaker 320, the EMC filter 330, the AC filter 340, the inverter 350, the DC link 360, the EMC filter 370, and the DC breaker 380.

The AC circuit breaker 320 may cut off the electrical power system side when an abnormality occurs in the electrical power system. The EMC filter 330 may reduce noise generated from the inverter. The AC filter 340 may reduce harmonics for sinusoidalization. The inverter 350 may be controlled to convert AC power into DC power. The DC link 360 may smooth the converted pulsating current into DC. The EMC filter 370 may reduce DC-side noise. The DC circuit breaker 380 may cut off a DC power source when an abnormality of the DC power source of the energy storage device 250 occurs.

Not all components illustrated in FIG. 3 are essential components. The power conversion device 230 may be implemented with more components than those illustrated in FIG. 3, and the power conversion device 230 may be implemented with fewer components. The power conversion device 230 illustrated in FIG. 3 may correspond identically to the power conversion device 230 illustrated in FIG. 2. The following operation may be performed by the operation of components of the power conversion device 230.

The power conversion device 230 may receive a command corresponding to the operation mode of the energy storage device 250 from the power management device 240, and control the operation of the energy storage device 250 such that power of the new and renewable energy power plant 100 is charged in the energy storage device or the power stored in the energy storage device is discharged, according to the command.

For example, when the amount of power of the new and renewable energy power plant 100 within the plurality of regions exceeds the reference capacity of the line 300, the power conversion device 230 may receive a command corresponding to the charging mode by communicating with the power management device 240 and charge the power of the new and renewable energy power plant 100 in the energy storage device 250.

For example, when the amount of power of the new and renewable energy power plant 100 within the plurality of regions does not exceed the reference capacity of the line 300, the power conversion device 230 may receive a command corresponding to the discharging mode by communicating with the power management device 240, and discharge the power stored in the energy storage device 250 to the electrical power system through the line 300.

For example, the power conversion device 230 may enable the energy storage system 200 to operate efficiently by providing the state information, operational information, operating information, and operation availability information of the power conversion device 230 to the power management device 240.

For example, the power conversion device 230 may monitor whether abnormal voltage, abnormal current, abnormal frequency, abnormal temperature, etc. are detected in the energy storage system 200, and stop the operation of the energy storage system 200 when an abnormal state is detected.

Figure 4:
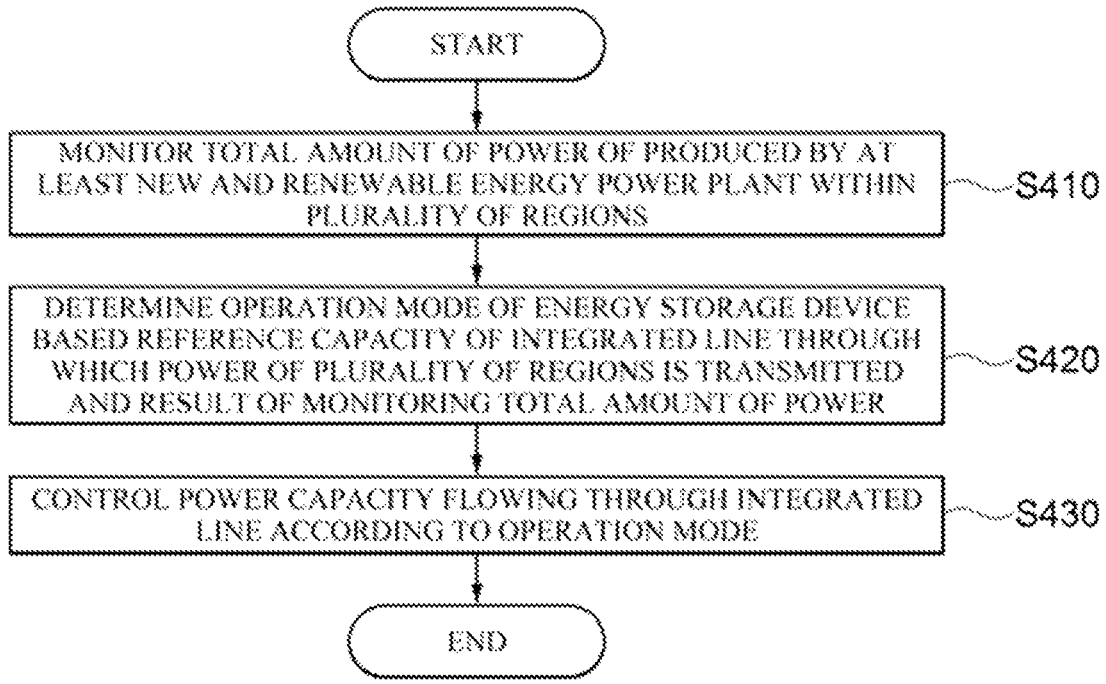
FIG. 4 is a flowchart illustrating a method of operation of an energy storage system according to an embodiment.

FIG. 4 is a flowchart illustrating a method of operation of the energy storage system 200 according to one embodiment.

Referring to FIG. 4, in step S410, the energy storage system 200 may monitor the total amount of power produced by at least one new and renewable energy power plant within the plurality of regions. For example, at least one new and renewable energy power plant may be installed in the plurality of regions. The energy storage system 200 may obtain information on the amount of power produced by the renewable energy power plant from the renewable energy power plant.

For example, the energy storage system 200 may obtain information on the amount of power from each new and renewable energy power plant. In addition, the energy storage system 200 may obtain information on the amount of power for the new and renewable energy power plant from the energy management system in each region. For example, the new and renewable energy power plant may be a solar power plant, a wind power plant, a tidal power plant, a wave power plant, a fuel cell power plant, a bio power plant, etc.

For example, the energy storage system 200 may monitor the total amount of power produced by the plurality of regions by summing the amount of power for the new and renewable energy power plants in the plurality of regions. In addition, the energy storage system 200 may monitor the total amount of power in real time.

In step S420, the energy storage system 200 may determine the operation mode of the energy storage device 250 based on the result of monitoring the total amount of power and the reference capacity of the integrated line 300 through which power of the plurality of regions is transmitted. For example, the energy storage device 250 may be a device that stores energy produced by the new and renewable energy power plant. The energy storage device 250 may include a battery and a battery management module.

When the amount of power flowing through the integrated line 300 exceeds the reference capacity, the integrated line 300 becomes unstable and may cause a failure of the integrated line 300 or a transformer. Accordingly, the amount of power flowing through the integrated line 300 needs to be adjusted so as not to exceed the reference capacity. The energy storage system 200 may control the power capacity of the integrated line 300 flowing through the energy storage system 200 based on the result of monitoring the amount of power produced by the new and renewable energy power plant.

For example, when the total amount of power produced by the new and renewable energy power plant 100 is sufficient, the energy storage system 200 may operate in the charging mode for charging an amount of power exceeding the reference capacity of the integrated line 300.

For example, when the total amount of power produced by the new and renewable energy power plant 100 is insufficient to supply enough to be the reference capacity to the integrated line 300, the energy storage system 200 may operate in the discharging mode for discharging power charged in the energy storage device 250.

In step S430, the energy storage system 200 may control the power capacity flowing through the line 300 according to the operation mode.

For example, when the operation mode of the energy storage device 250 is the charging mode, the energy storage system 200 may store the amount of power exceeding the reference capacity of the integrated line 300 in the energy storage device 250 and control the power flowing through the integrated line 300 not to exceed the reference capacity.

For another example, when the operation mode of the energy storage device 250 is the discharging mode, the energy storage system 200 may discharge the power stored in the energy storage device 250 and control the power flowing through the integrated line 300 not to exceed the reference capacity.

Figure 5:
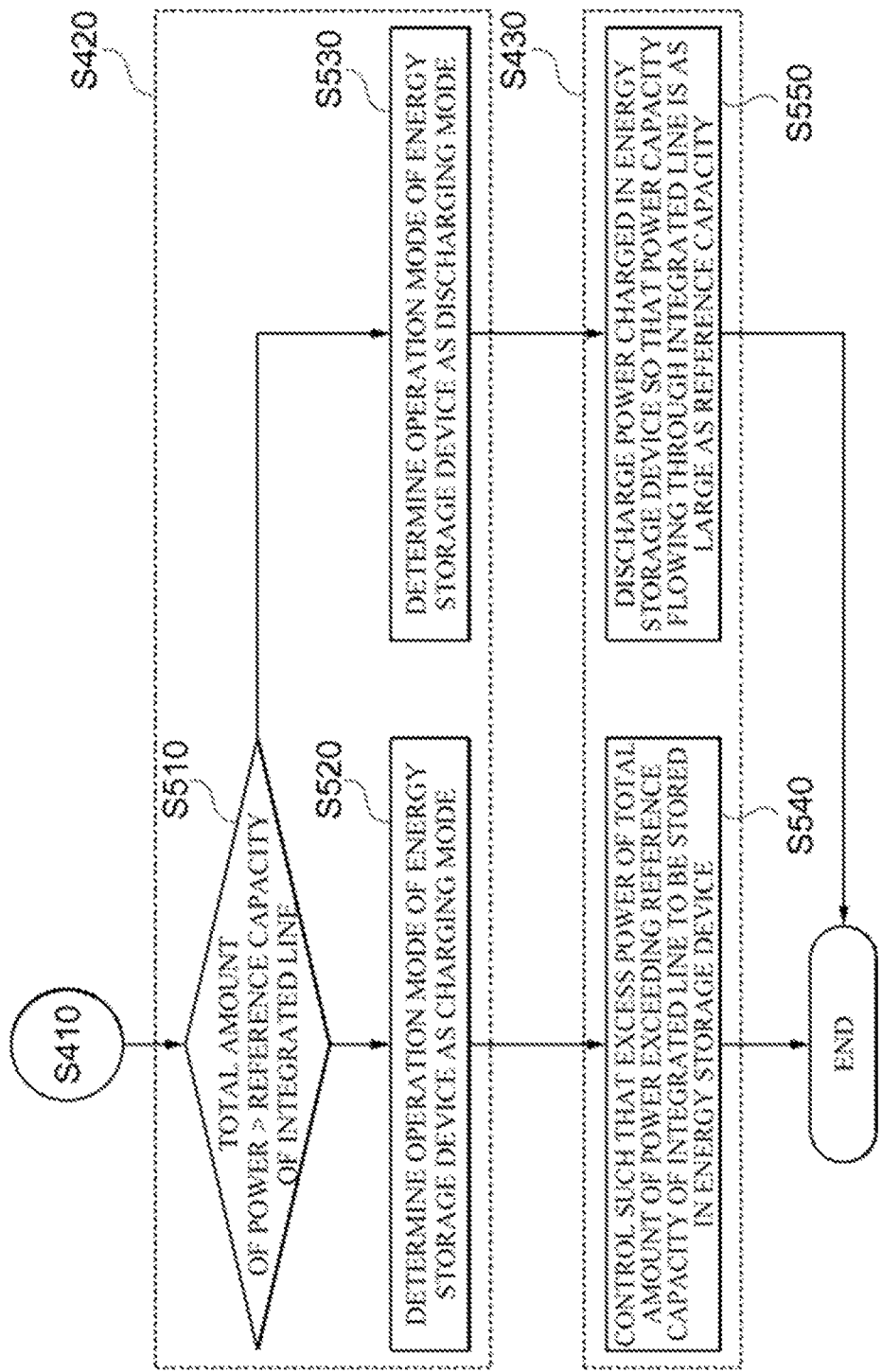
FIG. 5 is a flowchart illustrating the method of operation of the energy storage system that determines an operation mode of the energy storage device and controls a power capacity flowing through an integrated line according to the operation mode, according to an embodiment.

FIG. 5 is a flowchart illustrating an operating method of the energy storage system 200 that determines the operating mode of the energy storage device 250 and controls the power capacity flowing through the integrated line 300 according to the operating mode, according to an embodiment.

FIG. 5 is a diagram for describing steps S420 and S430 described in FIG. 4.

Referring to FIG. 5, in step S510, the energy storage system 200 may monitor the total amount of power of the new and renewable energy power plants in the plurality of regions to check whether the total amount of power exceeds the reference capacity of the integrated line 300.

When the total amount of power exceeds the reference capacity of the integrated line 300, according to step S520, the energy storage system 200 may determine the operation mode of the energy storage device 250 as the charging mode.

When the energy storage device 250 operates in the charging mode as the operating mode, in step S540, the energy storage system 200 may control such that excess power of the total amount of power exceeding the reference capacity of the integrated line 300 is stored in the energy storage device 250. For example, the energy storage system 200 may store DC power, which is obtained by converting the excess power from AC to DC through the power conversion device 230 in the energy storage system 200, in the energy storage device 250.

On the other side, when the total amount of power does not exceed the reference capacity of the line 300, according to step S530, the energy storage system 200 may determine the operation mode of the energy storage device 250 as the discharging mode.

When the energy storage device 250 operates in the discharging mode as the operating mode, in step S550, the energy storage system 200 may discharge the power charged in the energy storage device 250 so that the power capacity flowing through the integrated line 300 is as large as the reference capacity.

Figure 6:
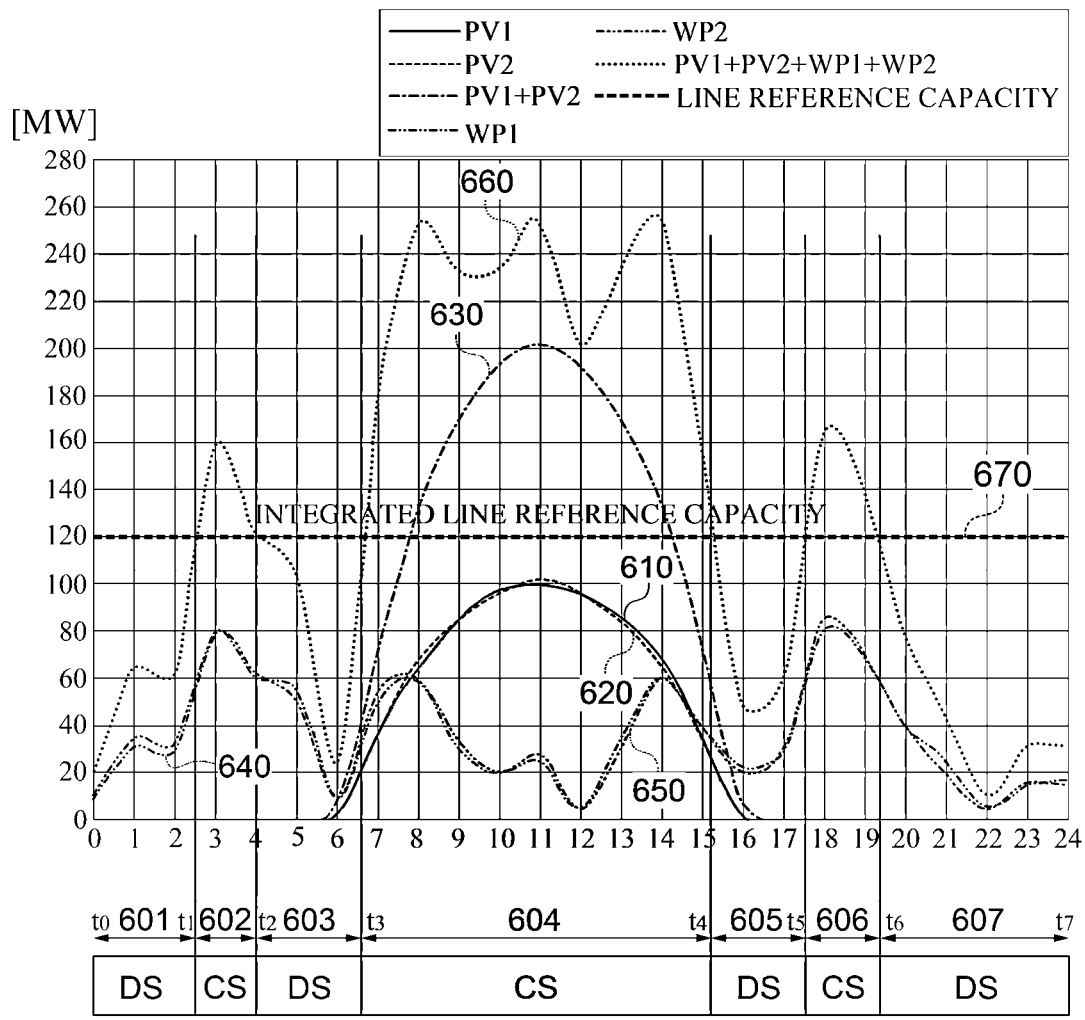
FIG. 6 is a graph for describing an operation of the energy storage system according to the amount of power generated by the new and renewable energy power plant in the plurality of regions according to one embodiment.

FIG. 6 is a graph for describing the operation of the energy storage system 200 according to the amount of power generated by the new and renewable energy power plants within the plurality of regions, according to an embodiment.

For example, it is assumed that the plurality of regions includes a first region, a second region, and a third region. It is assumed that there is a first solar power plant and a second solar power plant in the first region, a first wind power plant in the second region, and a second wind power plant in the third region. Additionally, it is assumed that the reference capacity of the integrated line 300 is 120 MW. Additionally, it is assumed that the first solar power plant, the first wind power plant, and the second wind power plant are existing new and renewable energy power plants, and the second solar power plant is a newly expanded new and renewable energy power plant. Additionally, it is assumed that a combined capacity of the first solar power plant, the first wind power plant, and the second wind power plant is 120 MW, and the maximum capacity of the second solar power plant is 140 MW.

Referring to FIG. 6, a first graph 610 represents the amount of power of the first solar power plant, a second graph 620 represents the amount of power of the second solar power plant, a third graph 630 represents the amount of power in the first region, a fourth graph 640 represents the amount of power of the first wind power plant, a fifth graph 650 represents the amount of power of the second wind power plant, a sixth graph 660 represents the total amount of power in the first region, second region, and third region, and a seventh graph 670 represents the reference capacity of the integrated line 300.

Referring to FIG. 6, in a section 601 from to t1, the total amount of power does not exceed the reference capacity of the integrated line 300. In a section 602 from t1 to t2, the total amount of power exceeds the reference capacity of the integrated line 300. In a section 603 from t2 to t3, the total amount of power does not exceed the reference capacity of the integrated line 300. In a section 604 from t3 to t4, the total amount of power exceeds the reference capacity of the integrated line 300. In a section 605 from t4 to t5, the total amount of power does not exceed the reference capacity of the integrated line 300. In a section 606 from t5 to t6, the total amount of power exceeds the reference capacity of the integrated line 300. In a section 607 from t6 to t7, the total amount of power does not exceed the reference capacity of the integrated line 300.

For example, the energy storage system 200 may determine the operation mode of the energy storage device 250 as the discharging mode for the sections where the total amount of power does not exceed the reference capacity of the integrated line 300, and discharge the power charged in the energy storage device 250. That is, when the total amount of power for the new and renewable energy power plants within the plurality of regions is less than the reference capacity of the integrated line 300, since the integrated line 300 has a surplus in capacity, the energy storage system 200 may discharge the charged power to the integrated line 300. As illustrated in FIG. 6, the energy storage system 200 may control the operation of the energy storage system 200 according to the discharge schedule in the section 601 from to t1, the section 603 from t2 to t3, the section 605 from t4 to t5, and the section 607 from t6 to t7.

For example, the energy storage system 200 may determine the operation mode of the energy storage device 250 as the charging mode for the sections where the total amount of power exceeds the reference capacity of the integrated line 300, and charge power in the energy storage device 250. In this case, the energy storage system 200 may charge an amount of power as large as excess power exceeding the reference capacity in the energy storage device 250. As illustrated in FIG. 6, the energy storage system 200 may control the operation of the energy storage system 200 according to the charging schedule in the section 602 from t1 to t2, the section 604 from t3 to t4, and section 606 from t5 to t6.

Figure 7:
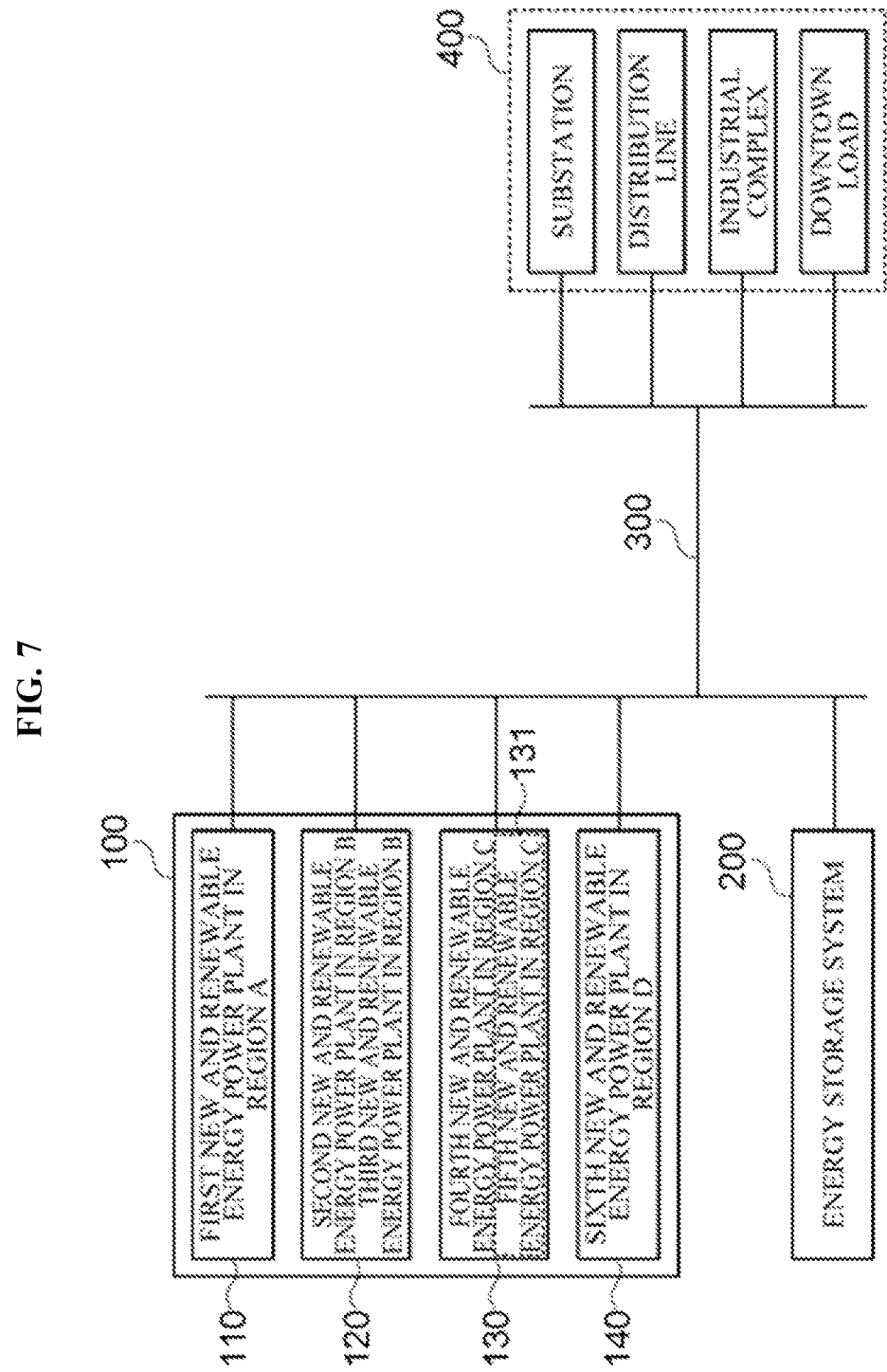
FIG. 7 is a diagram for describing an operation of the energy storage system when a new and renewable energy power plant is newly installed in a predetermined region, according to an embodiment.

FIG. 7 is a diagram for describing an operation of the energy storage system 200 when the new and renewable energy power plant is newly installed in a predetermined region, according to an embodiment.

The energy storage system 200 may monitor the individual power amount of each of the new and renewable energy power plants 100 within the plurality of regions and determine whether or not the operation mode for the energy storage device 250 is the charging mode for each of the plurality of regions based on the reference capacity of the integrated line 300 and the result of monitoring the individual power amount.

Referring to FIG. 7, it is assumed that the plurality of regions include region A, region B, and region C. It is assumed that there is a first new and renewable energy power plant in region A, a second new and renewable energy power plant and a third new and renewable energy power plant in region B, and a fourth new and renewable energy power plant in region C. Additionally, it is assumed that a fifth new and renewable energy power plant is newly installed in region C, and a sixth new and renewable energy power plant is newly installed in region D.

For example, it is assumed that, as a result of monitoring, by the energy storage system 200, the individual power amount of the new and renewable energy power plant 100 in region A, the new and renewable energy power plant 120 in region B, the new and renewable energy power plant 130 in region C, and the new and renewable energy power plant 140 in region D, the total power amount of power produced by the new and renewable energy power plants 110, 120, 130, and 140 in region A, region B, region C, and region D exceeds the reference capacity of the integrated line 300, and the power amount of power produced by the renewable energy power plants 110, 120, and 140 in region A, region B, and region D does not exceed the reference capacity of the integrated line 300.

The energy storage system 200 may deactivate the operation mode of the renewable energy power plants 110, 120, and 140 in region A, region B, and region D, and determine the operation mode of the new and renewable energy power plant 130 in region C as the charging mode. In this case, the power generated by the first new and renewable energy power plant, the second new and renewable energy power plant, the third new and renewable energy power plant, and the sixth new and renewable energy power plant may be transmitted to the load through the integrated line 300, and power generated from the fourth new and renewable energy power plant and the fifth new and renewable energy power plant may be charged in the energy storage system 200.

By determining whether or not the operation mode for the energy storage device 250 is the charging mode for each of the plurality of regions, the load of the integrated line 300 may be adjusted so that the amount of power flowing through the integrated line 300 does not exceed the reference capacity, and the utilization rate of the integrated line 300 may be increased.

Additionally, in the above example, within a range in which the amount of power flowing through the integrated line 300 does not exceed the reference capacity, the power generated by the fourth new and renewable energy power plant may be transmitted to the load through the integrated line 300, and the power generated by the fifth new and renewable energy power plant 131 may be charged in the energy storage system 200.

Figure 8:
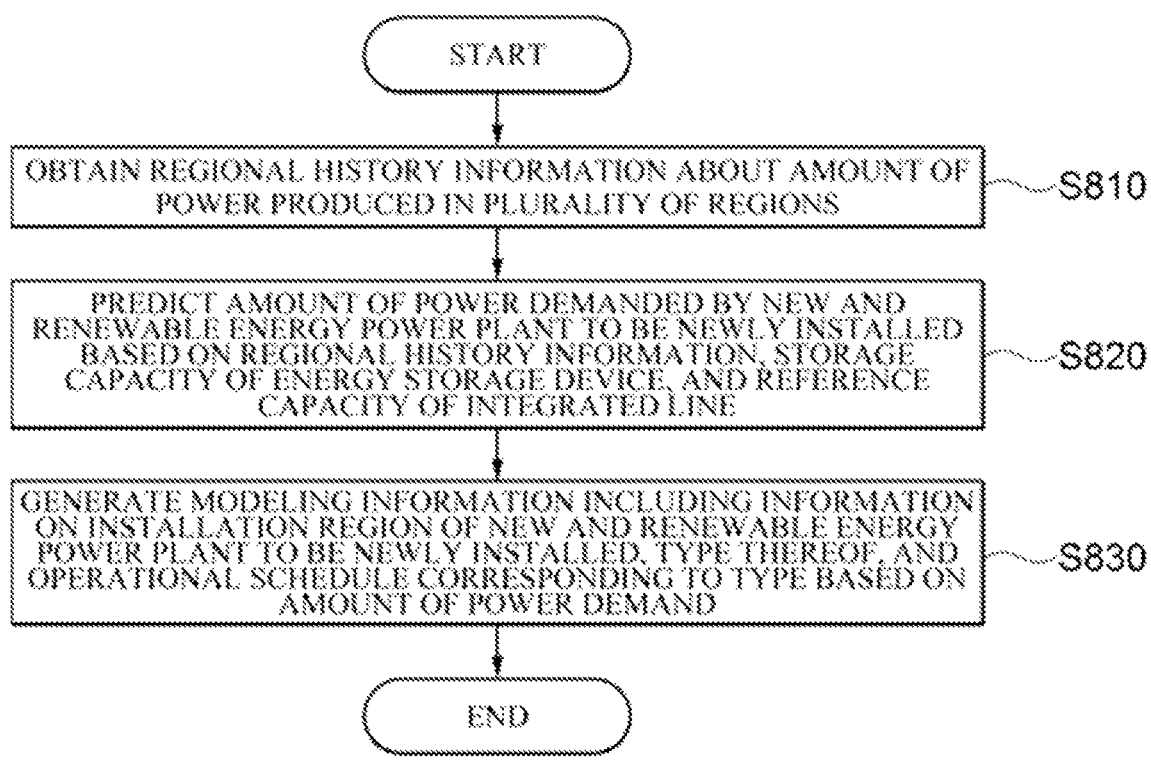
FIG. 8 is a flowchart illustrating a method of operation of an energy storage system that predicts the amount of power demanded by a new and renewable energy power plant to be newly installed based on the amount of power of a plurality of regions and generates modeling information of the new and renewable energy power plant, according to an embodiment.

FIG. 8 is a flowchart illustrating an operating method of the energy storage system 200 that predicts the amount of power demanded by a new and renewable energy power plant to be newly installed based on the amount of power of the plurality of regions and generates modeling information of the new and renewable energy power plant, according to an embodiment.

Referring to FIG. 8, in step S810, the energy storage system 200 may obtain regional history information about the amount of power produced in the plurality of regions. For example, the regional history information may be information about the amount of power produced by the new and renewable energy power plant for a preset period of time in a predetermined region.

In step S820, the energy storage system 200 may predict the amount of power demanded by the new and renewable energy power plant to be newly installed based on the regional history information, the storage capacity of the energy storage device 250, and the reference capacity of the integrated line 300.

For example, as for the regional history information, the amount of power produced in the first region may be 60 MW, the amount of power produced in the second region may be 50 MW, and the amount of power produced in the third region may be 70 MW. The storage capacity of the energy storage device 250 may be 350 MW, and the reference capacity of the integrated line 300 may be 240 MW. In this case, the range of the amount of power demand may be from a first amount of power demand corresponding to a first condition for allowing power to flow through the integrated line 300 as much as the reference capacity to a second amount of power demand corresponding to a second condition for allowing power to be fully charged in the energy storage device 250. Here, the first amount of power demand may be 60 MW, and the second amount of power demand may be 410 MW.

In step S830, the energy storage system 200 may generate modeling information including information on an installation region of the new and renewable energy power plant to be newly installed, a type thereof, and an operational schedule corresponding to the type based on the amount of power demand.

For example, for each type of new and renewable energy power plant, the amount of power that can be produced maybe set in advance according to a size and installation region of the power plant. The energy storage system 200 may generate modeling information including information on a type of the new and renewable energy power plant, an installation region thereof, and size of the power plant and an operational schedule for producing the amount of power demanded by the new and renewable energy power plant, based on the amount of power demand.

Figure 9:
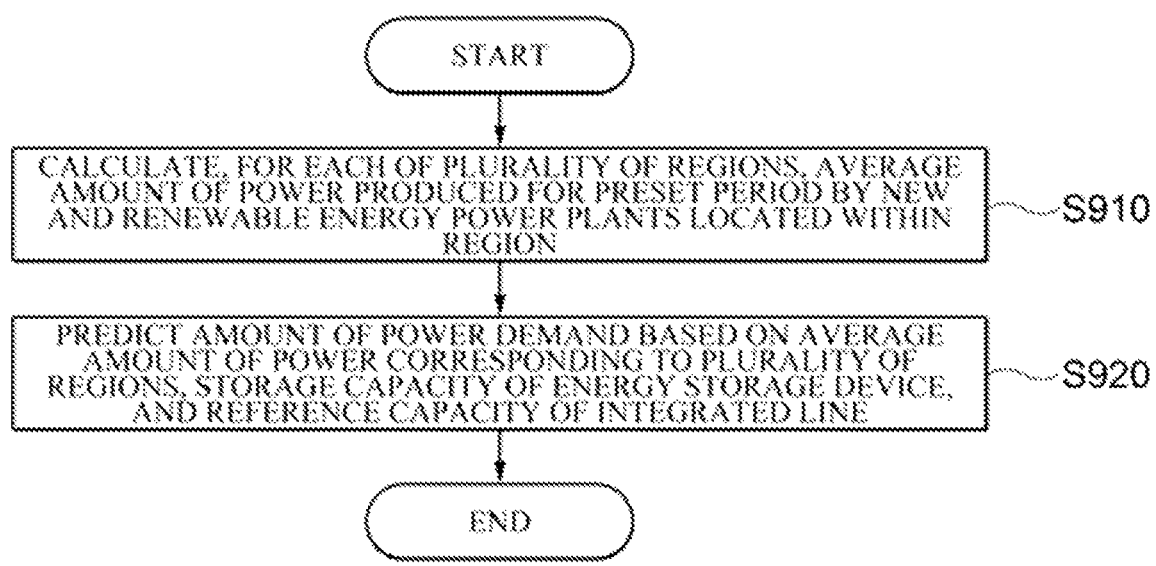
FIG. 9 is a flowchart illustrating a method of operation of an energy storage system that predicts the amount of power demanded by the new and renewable energy power plant to be newly installed according to an embodiment.

FIG. 9 is a flowchart illustrating a method of operation of the energy storage system 200 that predicts the amount of power demanded by the new and renewable energy power plant to be newly installed according to an embodiment.

Referring to FIG. 9, in step S910, the energy storage system 200 may calculate, for each of the plurality of regions, the average amount of power produced for a preset period by the new and renewable energy power plants located within the region.

In step S920, the energy storage system 200 may predict the amount of power demand based on the average amount of power corresponding to the plurality of regions, the storage capacity of the energy storage device 250, and the reference capacity of the integrated line 300. Additionally, the energy storage system 200 may predict the amount of power demand by changing it to the average amount of power.

Figure 10:
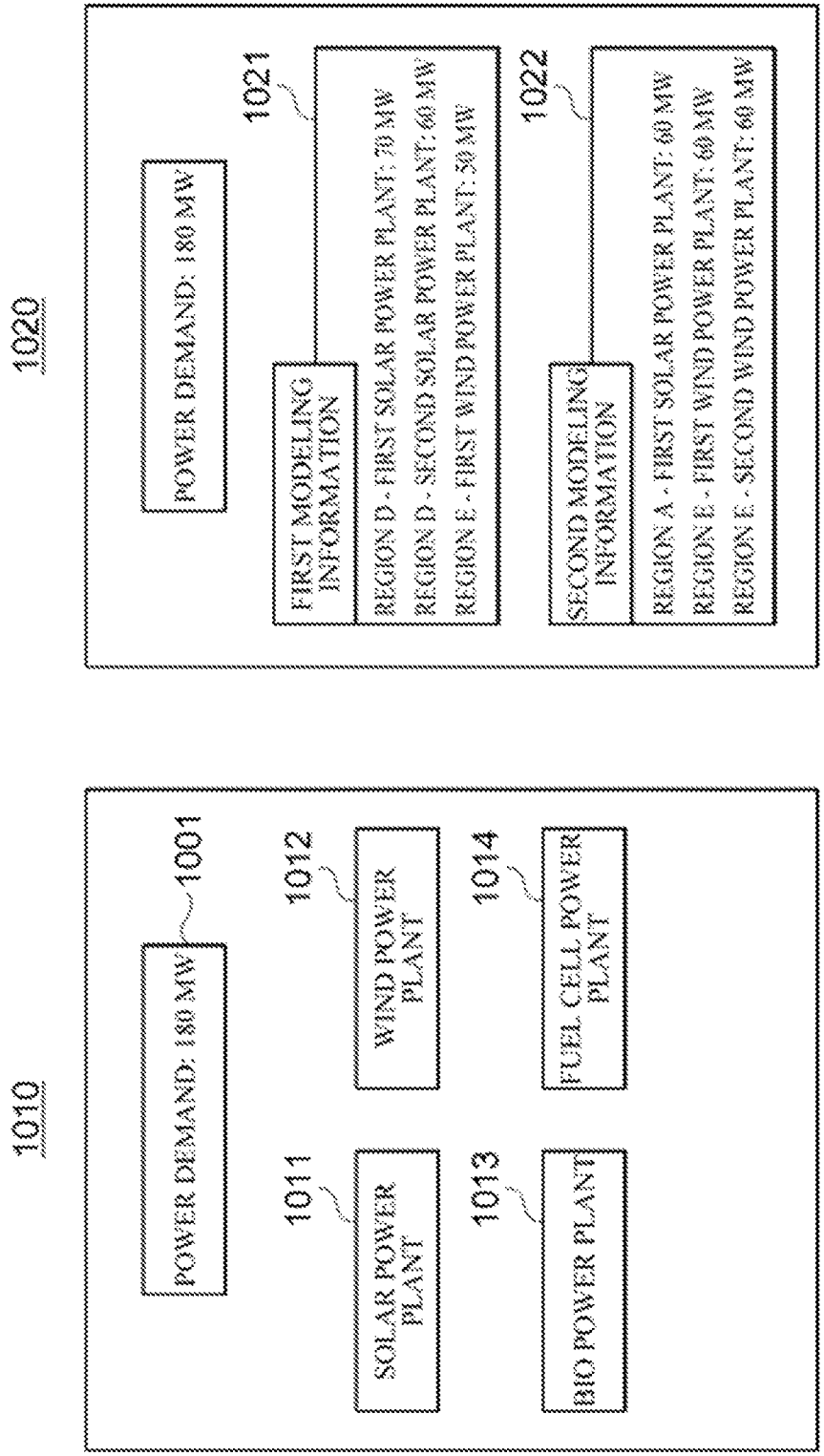
FIG. 10 is a diagram for describing a process of generating modeling information of the new and renewable energy power plant to be newly installed in a predetermined region, according to an embodiment.

FIG. 10 is a diagram for describing a process of generating modeling information of the new and renewable energy power plant to be newly installed in a predetermined region according to an embodiment.

Referring to an image 1010 of FIG. 10, the management device may display information used to model a new and renewable energy power plant to be newly installed in a predetermined region. For example, the management device may display information about the amount of power demand and type information of the new and renewable energy power plant. The management device may receive input information for selecting type information of the new and renewable energy power plant.

For example, the management device may display a solar power plant 1011, a wind power plant 1012, a bio power plant 1013, and a fuel cell power plant 1014 as the type information of the new and renewable energy power plant. The management device may receive input information for selecting the solar power plant 1011 and the wind power plant 1012.

For example, the management device may transmit the input information to the energy storage system 200. The energy storage system 200 may generate modeling information about the new and renewable energy power plant based on the input information. For another example, the management device may generate modeling information of the new and renewable energy power plant based on the input information.

Referring to an image 1020 of FIG. 10, the management device may display modeling information of the new and renewable energy power plant to be newly installed. For example, the management device may generate at least one piece of modeling information 1021 and 1022 by combining the solar power plant and the wind power plant. The management device may display at least one piece of modeling information 1021 and 1022. The modeling information 1021 and 1022 may include information on the installation region of the new and renewable energy power plant to be newly installed, the type of power plant, and the amount of power that can be produced for each power plant.

As illustrated in the image 1020 of FIG. 10, when there is a plurality of modeling information, the management device may display the modeling information according to a preset priority. For example, the preset priority may be set based on at least one of the order of interest of the power plant, required expansion cost, expansion location, and expansion scale.

The energy storage system 200 and power system described in this disclosure may be implemented as hardware components, software components, and/or a combination of hardware components and software components. In addition, the present disclosure may be provided in the form of a computer program stored in a computer-readable storage medium so as to perform the method of operation of the energy storage system 200 and the power system. In addition, the present disclosure can be written as a program that can be executed on a computer, and can be implemented in a general-purpose digital computer that operates such a program using the computer-readable storage medium.

Such computer-readable storage media may include a read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and may be any device capable of storing instructions or software, related data, data files, and data structures and capable of providing instructions or software, related data, data files, and data structures to a processor or computer so that the processor or computer executes the instructions.

Even if the new and renewable energy power plants are expanded, it is possible to contribute to the stabilization of the electrical power system through the energy storage system without the expansion of a line.

Even if the new and renewable energy power plants are expanded, the line can be operated without the expansion of a line by adjusting the load of the integrated line using the energy storage system.

By controlling a charging operation or a discharging operation of the energy storage system, a utilization rate of the integrated line can be improved.

By expanding the new and renewable energy power plants from existing facilities, the goal of reducing carbon dioxide can be achieved.

Although the embodiments have been described in detail above, the scope of the present invention is not limited thereto, and various modifications and improvements made by those skilled in the art using the basic concept of the present invention defined in the following claims also fall within the scope of the present invention.

What is claimed is:

1. An energy storage system comprising:
an energy storage device configured to store energy generated from a new and renewable energy power plant;
a power management device configured to:
monitor a total amount of power produced by at least one new and renewable energy power plant in each of a plurality of regions;
determine an operation mode of the energy storage device based on a reference capacity of an integrated line through which power produced in the plurality of regions is transmitted to a load and a result of monitoring the total power amount, wherein the power produced in each of the plurality of regions is delivered to the integrated line through individual lines; and
adjust a load of the integrated line to control a power capacity flowing through the integrated line according to the operation mode; and
a power conversion device configured to receive a command corresponding to the operation mode from the power management device and control an operation of the energy storage device according to the command,
wherein the power management device is further configured to:
obtain regional history information about an amount of power produced in the plurality of regions;
predict an amount of power corresponding to a condition, which is based on a storage capacity of the energy storage device and the reference capacity of the integrated line, of a new and renewable energy power plant to be newly installed using the condition and the regional history information; and
generate modeling information including information on an installation region of the new and renewable energy power plant to be newly installed, a type thereof, and an operational schedule corresponding to the type, based on the predicted amount of power.

2. The energy storage system of claim 1, wherein the power management device is further configured to:
- determine the operation mode of the energy storage device as a charging mode when the total amount of power exceeds the reference capacity of the integrated line; and
- determine the operation mode of the energy storage device as a discharging mode when the total amount of power does not exceed the reference capacity of the integrated line.

3. The energy storage system of claim 1, wherein the power management device is further configured to:
- monitor an individual power amount of each of the plurality of regions, and determine whether or not the operation mode of the energy storage device is a charging mode for each of the plurality of regions, based on the reference capacity of the integrated line and a result of monitoring the individual power amount.

4. The energy storage system of claim 1, wherein, when the operation mode is determined as a charging mode, the power management device is configured to deliver a first command, which is for controlling excess power of the total amount of power exceeding the reference capacity of the integrated line to be stored in the energy storage device, to the power conversion device.

5. The energy storage system of claim 1, wherein, when the operation mode is determined as a discharging mode, the power management device is configured to deliver a second command, which is for discharging power charged in the energy storage device based on the total amount of power in the plurality of regions so that the power capacity flowing through the integrated line is as large as the reference capacity, to the power conversion device.

6. The energy storage system of claim 1, wherein, when a first new and renewable energy power plant is newly installed in a first region among the plurality of regions, the power management device is configured to determine the operation mode of the energy storage device based on a result of monitoring the amount of power of the at least one new and renewable energy power plant in each of the plurality of regions and the first new and renewable energy power plant, and the reference capacity of the integrated line.

7. The energy storage system of claim 1, wherein the power management device is configured to transmit the modeling information to an operator's management device.

8. The energy storage system of claim 1, wherein the power management device is configured to:
- calculate, for each of the plurality of regions, an average amount of power produced during a preset period by the new and renewable energy power plant located within the region; and
- predict an amount of power corresponding to the condition of the new and renewable energy power plant to be newly installed based on the average amount of power corresponding to the plurality of regions, the storage capacity of the energy storage device, and the reference capacity of the integrated line.

9. The energy storage system of claim 1, wherein the energy storage device comprises:
- a battery configured to discharge charged power or charge power, through the power conversion device according to the operation mode; and
- a battery management module configured to manage state information of the battery.

10. A method of operation of an energy storage system, the method comprising:
- monitoring a total amount of power produced by at least one new and renewable energy power plant in each of a plurality of regions;
- determining an operation mode of an energy storage device based on a reference capacity of an integrated line through which power produced in the plurality of regions is transmitted to a load and a result of monitoring the total power amount, wherein the power produced in each of the plurality of regions is delivered to the integrated line through individual lines;
- adjusting a load of the integrated line to control a power capacity flowing through the integrated line according to the operation mode;
- obtaining regional history information about an amount of power produced by the plurality of regions;
- predicting an amount of power corresponding to a condition, which is based on a storage capacity of the energy storage device and the reference capacity of the integrated line, of a new and renewable energy power plant to be newly installed using the condition and the regional history information; and
- generating modeling information including information on an installation location of the new and renewable energy power plant to be newly installed, a type thereof, and an operational schedule corresponding to the type, based on the predicted amount of power.

11. The method of claim 10, wherein the determining of the operation mode of the energy storage device comprises:
- determining the operation mode of the energy storage device as a charging mode when the total amount of power exceeds the reference capacity of the integrated line; and
- determining the operation mode of the energy storage device as a discharging mode when the total amount of power does not exceed the reference capacity of the integrated line.

12. The method of claim 10, wherein the controlling of the power capacity flowing through the integrated line according to the operation mode comprises:
- delivering a first command, which is for controlling excess power of the total amount of power exceeding the reference capacity of the integrated line to be stored in the energy storage device, to a power conversion device; and
- delivering a second command, which is for discharging power charged in the energy storage device based on the total amount of power of the plurality of regions so that the power capacity flowing through the integrated line is as large as the reference capacity, to the power conversion device.

13. A power system comprising:
- new and renewable energy power plants in a plurality of regions;
- an integrated line that is connected to the new and renewable energy power plants in the plurality of regions and is configured to deliver power generated in each of the plurality of regions through individual lines; and
- an energy storage system that is connected to the integrated line, and is configured to monitor a total amount of power produced by at least one new and renewable energy power plant in each of the plurality of regions, determine an operation mode of the energy storage device based on a reference capacity of an integrated line through which power produced in the plurality of regions is transmitted to a load and a result of monitoring the total amount of power, and adjust a load of the integrated line to control a power capacity flowing through the integrated line according to the operation mode, wherein the energy storage system is further configured to:

obtain regional history information about an amount of power produced in the plurality of regions;

predict an amount of power corresponding to a condition, which is based on a storage capacity of the energy storage device and the reference capacity of the integrated line, of a new and renewable energy power plant to be newly installed using the condition and the regional history information; and generate modeling information including information on an installation region of the new renewable energy power plant to be newly installed, a type thereof, and an operational schedule corresponding to the type, based on the predicted amount of power.

* * * * *